Figure 1:
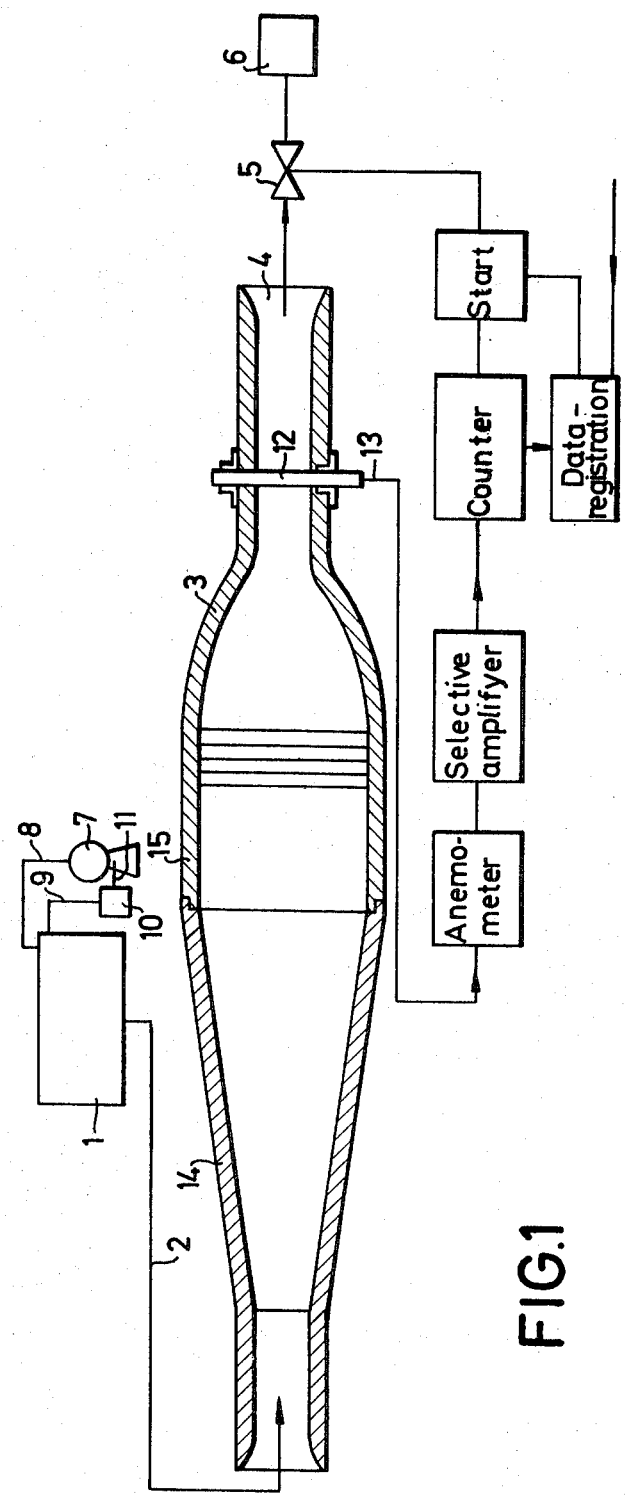

United States Patent

Rasmussen

[15] 3,645,132
[45] Feb. 29, 1972

[54] ELECTRICAL FLOW-MEASURING PROBE

[72] Inventor: Carl Georg Rasmussen, Ballerup, Denmark

[73] Assignee: Disa Elektronik A/S (Dansk Industri Syndikat A/S), Herlev, Denmark

[22] Filed: Sept. 3, 1969

[21] Appl. No.: 862,606

[30] Foreign Application Priority Data

Sept. 23, 1968 Denmark..............................4569/68

[52] U.S. Cl.................................................73/189, 73/204
[51] Int. Cl.........................................................G01p 13/00
[58] Field of Search......................73/189, 204, 194 B, 194 C

[56] References Cited

UNITED STATES PATENTS

| | | | |
|---|---|---|---|
| 2,870,305 | 1/1959 | Ling......................................| 73/204 X |
| 3,251,225 | 5/1966 | Luft........................................| 73/204 |
| 3,352,154 | 11/1967 | Djorup....................................| 73/189 |
| 3,435,676 | 4/1969 | Bruckner...............................| 73/204 X |
| 3,498,127 | 3/1970 | Richards................................| 73/204 |

OTHER PUBLICATIONS

Mair, W. A. The Effect of a Rear- Mounted Disc on the Drag of a Blunt- Based Body of Revolution. From the Aeronautical Quarterly. Nov. 1965. pp. 350– 359.

Primary Examiner—Jerry W. Myracle
Attorney—Beveridge & De Grandi

[57] ABSTRACT

A hot-film measuring probe for measuring the shedding frequency of vortices in a medium in which a sensing member is arranged on the vortice generating body. The sensing member or members are preferably arranged to face the direction of flow. A vane on a pivotably mounted body may ascertain correct position of sensing members with changing directions of flow. Practical measurements can be carried out in the higher range of flow in which Reynolds number exceeds 300.

A measuring device with a measuring probe as described renders signals which can be converted in digital signals to be counted or stored.

A measuring device with a measuring probe comprising two sensing members increases the quality of the combined signal.

A measuring device with two probes renders a difference signal indicating the direction of flow.

14 Claims, 6 Drawing Figures

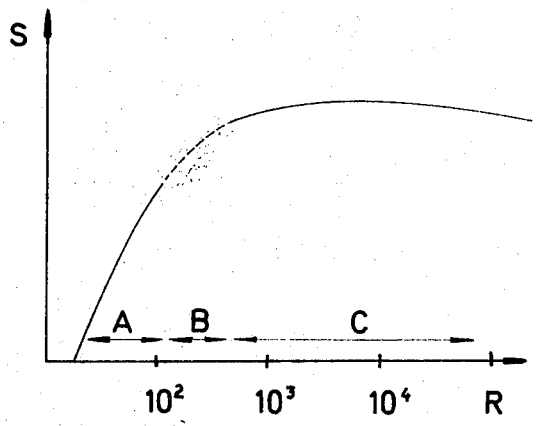
FIG 3
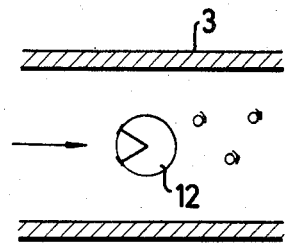
FIG.2
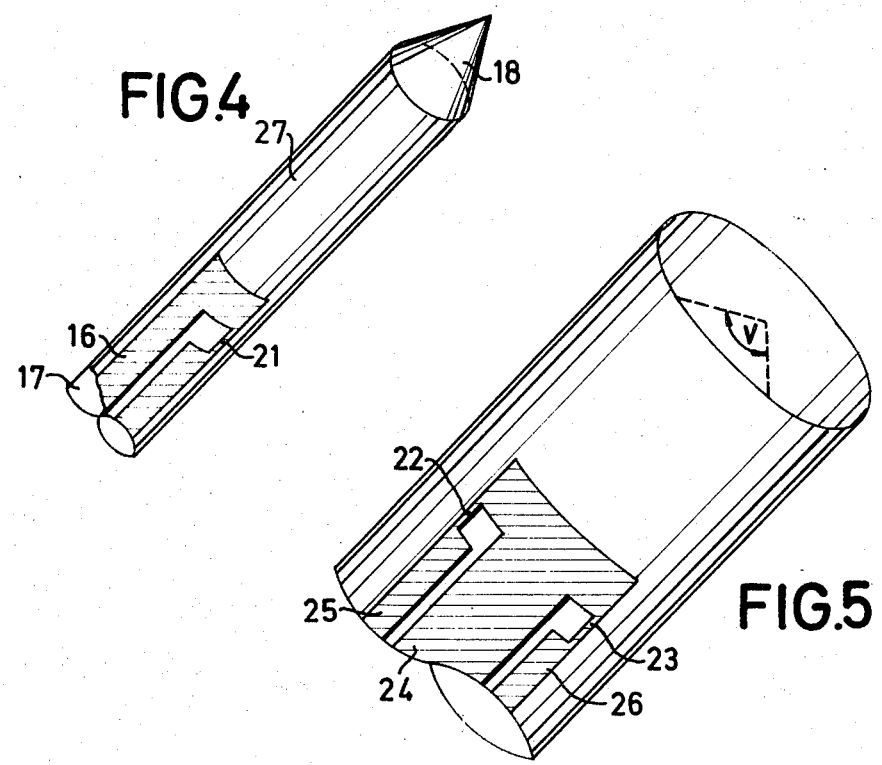
FIG.4
FIG.5

ELECTRICAL FLOW-MEASURING PROBE

SUMMARY OF THE INVENTION

This invention relates to a measuring probe comprising an electrically conductive sensing member provided with leads and carried by an insulating carrier member.

Measuring probes of this kind are used for carrying out measurements in flowing media. Many different designs are known, of which some representative ones are described in the specifications to U.S. Pats. Nos. 2,870,305 and 3,333,470.

In an anemometer, in which such a measuring probe is employed, electrical signals are produced by the electrically conductive sensing member, which is being kept heated by means of an electric current, being cooled by the medium flowing past, so that changes in the temperature of the sensing member and consequently corresponding changes in the electrical resistance occur.

The measurements can be effected either by keeping the current passing through the electrical sensing member constant, or, by keeping the temperature of the electrical sensing member constant and changing the current concurrent with the variations in the heat emission.

An object of the present invention is to provide a practically applicable measuring device that is capable of generating an electric digital signal which, within a suitable temperature range, with appropriate accuracy is correlated to the quantity to be measured, e.g., velocity or volume of a passing medium.

It is known that whereas the flow of liquid around the front of a stationary body can, with good approximation, be regarded as a potential flow, the flow around the rear of the body differs herefrom, in that in the (boundary) layer vortices are shed which are carried away with the flow. This vortex shedding is of a fairly regular nature when the flow takes place across a cylinder which is of such a length that one can ignore the influence of the ends and can regard the flow as being identical in planes at right angles to the axis of the cylinder. In this case, vortices are shed alternately from the one and the other side of the cylinder, so that the wake comes to comprise a double row of vortices in a so-called vortex street, in which each vortex lies opposite to the center between two successive vortices in the opposite row. In view of the great importance flow conditions in fluids have for maritime and aeronautical designs, many studies have been carried out in order to clarify the conditions; by way of example reference is made to report No. 1191 of 1954 by the National Advisory Committee for Aeronautics by Anatol Roshko. The measurements are effected by means of a hot wire anemometer placed behind a cylindrical body in a flowing fluid. Many research workers have investigated into the connection between vortex shedding frequencies and fluid-velocity, and in this connection numerous measurements of Strouhals number S as a function of Reynolds number R have been made. Strouhals number is determined by $$S = n_1^o (d/V_o),$$

in which $n_1^o$ is the unilateral vortex shedding frequency, $d$ is the diameter of the cylinder and $U_o$ the free flow velocity.

The results of the measurements show that only for values of Reynolds number between 40 and 150 a stable, regular vortex street is obtained.

At values of Reynolds number between 150 and 300, there exist considerable instabilities, which increase with rising Reynolds number and which render the determination of the frequency difficult.

At values of Reynolds number above 300, it is possible to determine the frequency again by oscillographical methods, but the range is termed irregular on account of the strong noise signals. Incidentally, Strouhals number $S$ is, to all intents and purposes, independent of Reynolds number in this range.

As a result of the measurements carried out earlier, it has been found that it is possible to effect a determination of the fluid-velocity on the basis of a determination of the vortex shedding frequency within that range in which Strouhals number is a function of Reynolds number, i.e., in the stable range for values of Reynolds number between 40 and 150.

The present invention is based on the recognition of the fact that, irrespective of the not very promising results of studies of the range in which Reynolds number is higher than 300, it is possible to produce signals sufficiently undisturbed for obtaining representative and sufficiently accurate measurements for the practical measuring of, for instance, flow velocity and flow volume.

The study on which the invention is based has shown that the vortex frequency signal desired should not be looked for somewhere in the wake of the cylinder, but on the contrary, on the surface of the cylinder proper.

In the light of this new recognition, the subject matter of the invention is primarily a new measuring probe which differs from hitherto known measuring arrangements measuring vortex frequency in flowing fluids, in that the probe combines the body giving rise to the vortices and the electrical sensor generating the electrical measuring signals.

In accordance with this, the carrier member of the measuring probe according to the invention is shaped as a vortex-forming member in a flowing fluid, and the sensing member is arranged on a part of the surface of the carrier member at a distance from the ends of the carrier member. The sensing member extends across such a small area of the surface of the carrier member, both in its longitudinal and in its circumferential direction, that the sensing zone can be adjusted in relation to the place where the vortex shedding occurs.

In an expedient embodiment of the measuring probe according to the invention, two electrically conductive sensing members with leads for deriving two electric signals, one from each sensing member, are arranged on the surface of the carrier member. This provides the possibility of obtaining a still better signal by combining the two signals. With a view to compensation of noise signals, the two sensing members can be arranged spaced from each other along the circumference of the carrier member in the same cross sections.

The investigations which form the basis of the invention, have led to another novel recognition, viz that the quality of the signal is, contrary to expectations, improved when the sensing member does not, as should be expected, face rearward, but, to the contrary, when it faces forward in the direction of flow, namely in such a way that it is turned at a small angle in relation to the direction of flow.

In accordance herewith, the invention also relates to a measuring device with a measuring probe as dealt with here, fitted in a duct for a flowing medium with its axial direction inclined to the direction of flow in which measuring apparatus the measuring probe is mounted with the sensing member facing the flow direction. If a measuring probe with two sensing members is employed, it is preferably disposed in such a way that there is only one sensing member at each side of a plane parallel to the flow direction and containing the axis of the measuring probe, preferably at an angular distance of 15° to 30° calculated along the circumference of the carrier member.

The measuring probe can be mounted pivotably around its own axis and said axis can be provided with a vane, which ensures that the measuring probe maintains the correct position in a freely flowing fluid.

The measuring probe and the measuring device according to the invention open the way for quite new possibilities for the carrying out and registering of measurements as the consequence of the production of a, for practical application, sufficiently interference-free and accurate signal. In an embodiment of a measuring device according to the invention the sensing members are through leads connected to an amplifier having a frequency response suitable for the measuring range desired, the output of which amplifier can be connected to an electronic counter for digital indication of velocity or flow.

Figure 6:
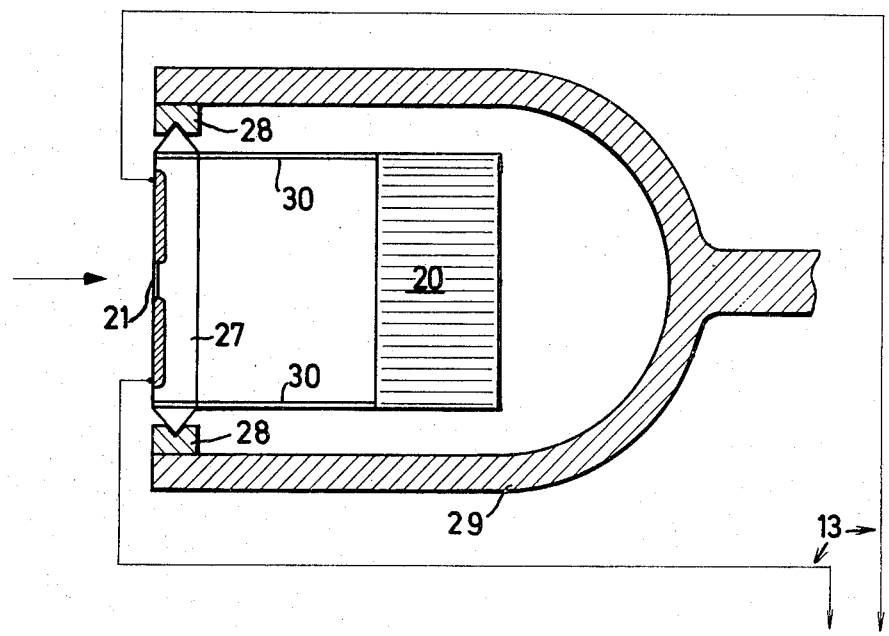

By combining the counter with a data registration machine, price calculations of quantities of liquid delivered can be obtained. In the following, the invention is explained in greater detail by way of examples while reference is made to the purely diagrammatical accompanying drawings, in which FIG. 1 shows a measuring arrangement with a measuring probe according to the invention, FIG. 2 shows a section through a part of the nozzle like duct shown in FIG. 1 at right angles to the measuring probe and parallel to the direction of flow, FIG. 3 is an idealized curve, which shows the connection between Reynolds numbers and Strouhals numbers, FIG. 4 shows a part of an embodiment of a measuring probe according to the invention with a sensor, FIG. 5 shows a part of another embodiment of a measuring probe according to the invention having two sensors, and FIG. 6 shows a measuring probe with a vane according to the invention.

The measuring arrangement shown in FIG. 1 is meant to illustrate the features characteristic for the present invention, as well as to indicate an example of a practical application. In FIG. 1, 1 denotes a storage tank for a liquid which, via a line 2, is connected to a measuring nozzlelike duct 3, the outlet of which is connected with a valve 5, from which the liquid can be supplied to a consumer 6. The pressure necessary for bringing about a flow of the liquid through the duct can be obtained by the tank 1 being situated at a higher level than the duct 3, or by means of a pump.

The valve 5 can be a solenoid valve, which is opened by a pulse from a starter system which, in the block diagram shown, is denoted "start."

In the duct 3, a measuring probe 12 of the hot-film type is inserted, but designed in accordance with the present invention, in a way as will be explained later.

The electric signal that is produced resulting from the flow of the liquid through the duct, is led from the measuring probe through electrical leads 13 to an apparatus of the anemometer type, known per se, and which in the block diagram shown is denoted "Anemometer." The output signal from the anemometer is led to a selective AC amplifier and the pure sine output signal is supplied to a counter and possibly to a data registration apparatus.

The nozzlelike duct 3 is designed with a conical inlet part 14, in which the flow velocity of the liquid diminishes in the direction of flow. Thereupon follows a cylindrical part 15, which contains filters and possibly flow-smoothing members.

The fluid flowing past the measuring probe 12, produces, as illustrated in FIG. 2, a vortex street behind the probe when the flow velocity is sufficiently high.

The measurements in the vortex street behind a cylindrical body quoted in the literature, is carried out at some distance from the body by means of a sensor that is connected with an anemometer device by means of which a thin wire or a film on the sensor is kept at a constant temperature above the temperature of the fluid flowing past.

The result of the studies reported in the literature is expressed in the form of curves, in that Strouhals numbers have been depicted as a function of Reynolds numbers.

In FIG. 3, a greatly idealized rendition of this curve is shown.

Strouhals number is defined by the following expression:

$$S = n_1 \cdot d / V_o$$

in which $n_1$ is the unilateral vortex shedding frequency, $d$ is the diameter of the cylinder and $V_o$ the free flow velocity.

The range in which Reynolds number lies between 40 and 150 is termed the stable range, whereas the range in which Reynolds number lies between 150 and 300, is called the transitional range, which is characterized by great instability. Finally, the range in which Reynolds number lies between 300 and 10,000, is termed the irregular range since there exists no reproducible unequivocal correlation.

In the first-mentioned range, Strouhals number strongly depends upon Reynolds number, whereas in the last-mentioned range it is, in the main, constant and thus independent of Reynolds number.

While in the literature the range, in which Reynolds number lies between 40 and 150, is regarded as well-suited for determination of flow velocities from frequency measurements, this does not apply to the other two ranges. In the irregular range it is, admittedly, possible to identify a frequency by statistical means, the signals have, however, not proved themselves suited for practical application.

The present invention is based on the recognition, that it is the manner in which the signals have been derived, which has been a principal cause for it being impossible to obtain a usable signal.

Instead of employing a circular-cylindrical body for the production of the vortex street in the wake as well as a separate sensor member disposed in this vortex street, the inventor has solved the problem of obtaining a usable signal by combining the vortex-generating body and the sensor into a unit, so that the sensor is arranged directly on the body.

Already by this measure a significantly better signal is obtained than has hitherto been possible.

By the rotation of the sensor around its axis, it has surprisingly been found that the best signals are obtained when the sensor is on that side of the measuring probe which faces the flowing fluid, while on might have immediately expected that the best result would be obtained in the sensing member were to lie on the transition point to the rear of the measuring probe, where the vortex shedding takes place.

The measuring probe according to the present invention renders signals in which a component having a frequency which is dependent upon the flow velocity is clearly distinguishable, and moreover a component which, with great certainty shows zero passages which it is possible to count by means of an appropriate apparatus. By this means it becomes feasible to convert an analogous signal into a digital signal, whereby a practical utilization of the signal becomes possible.

From Reynolds number:

$$R = \frac{U \cdot d}{\nu} = \frac{Q \cdot d}{\frac{\pi}{4} \cdot D^2 \cdot \nu}$$

in which $R$ is Reynolds number, $U$ is the flow velocity, $d$ is the diameter of the vortex cylinder, $D$ is the diameter of the duct and $\nu$ is the kinematic friction coefficient, the dimensions can be calculated.

If it is desired, for instance, to measure a volume flow $Q$ of between 6 liters per minute and 60 liters per minute and the minimum value for Reynolds number is selected to lie at 600, i.e., a suitable distance above the transitional range, and there is applied a fluid for which $\nu$ equals $1.5 = 10^{-2}$ cm.$^2$/sec., in which case the ratio is found to be $D^2/d = 14.2$ cm. If, for practical reasons, the diameter of measuring probe is selected to be 0.2 cm., the diameter of the duct becomes 1.68 cm.

FIG. 4 shows a part of an embodiment of a measuring probe according to the invention. The measuring probe comprises a body 27, which at least on the part of surface carrying the electrically conductive members is electrically insulating, but which can consist entirely of glass or quartz or other ceramic material. On the insulating body there is, e.g., by sputtering, applied a film of conductive material. For use in conductive fluids, the conductive material is covered by a thin film of insulating material 17 which, in FIG. 4 is only shown on a small part at the bottom to the left. The film 17 can be produced by sputtering. Sputtering is a technique known per se, whereby material is atomized by ion bombardment and is transferred in an electrical way to form a coating. The carrier body 27 for the electrical film serves simultaneously as vortex cylinder. At the one end shown it is tapered with a cone 18, by means of which it can be mounted pivotably in a bearing, not shown. In order to maintain the carrier body 27 in correct position under the influence of the flowing fluid a vane 20 can be mounted on the carrier body as is shown in FIG. 6 in which the direction of flow is indicated by an arrow. The carrier body 27 is tapered at both ends and mounted pivotably in bearings 28 carried by a bifurcated support 29 mounted in the measuring duct, not shown. The vane 20 is by means of a pair of thin supports 30 connected with the carrier body 27.

It has been found that excellent results are obtained, if the sensing member is turned from 15° to 30° from the plane which contains the direction of flow and the axis of the measuring probe. The sensing member proper is denoted with 21 in FIG. 4 and is constituted of a narrow portion of the film 16, the remaining parts of which represent the electric supply leads.

In the embodiment shown in FIG. 5, two sensing members 22 and 23 are arranged, which have a common lead 24 as well as separate leads, 25 and 26, respectively. The sensing members can possibly have completely separate leads. The main direction of the sensing member lies in the direction of the generatrix of the carrier body.

The invention is described on the basis of a few examples, but many other embodiments and uses are feasible. The measuring probe can have more than two measuring members and the carrier member does not have to be circular-cylindrical. In the duct, the measuring probe can be mounted inclined in relation to the direction of flow, i.e., at an angle to same differing from 90°, the inclination, however, being sufficiently small to obtain a reasonable large signal-to-noise ratio. By such mounting, a certain automatic cleaning of the measuring probe can be achieved.

The nozzle like duct can have arbitrarily suitable forms of cross section, even though the circular one will generally be employed for practical reasons. The dimensioning is selected in such a way that Reynolds number exceeds 500 within the measuring range selected.

The inaccuracies arising from starting and stopping which, as a consequence of the flow velocity not being sufficiently great, are going to have a relatively greater influence on the accuracy of the measuring results when fluids are delivered in small quantities, and provision ought therefore be made for as fast an opening and closing as possible.

Any quantity correlated with the vortex shedding frequency, such as velocity of flow and volume of flow, can be measured by means of the apparatus according to the invention and the measuring results, which are available preferably in the form of digital signals, can be employed to control various functions.

The generation of an analogous signal for the direction of flow by means of the so-called X-hot-wire technique is known.

The measuring probe according to the invention renders the generation of a digital signal for the direction of flow possible. To this end, two measuring probes are used which are disposed in the flowing fluid so that mutually they form an angle, and are both inclined in relation to the direction of flow. It has been found that the frequency of the signals from each of the two measuring probes is dependent of the angle the axis of the measuring probe forms to the direction of flow. If the measuring probes are mounted in such a manner that a deviation of the direction of flow from a given direction, the reference direction, in the one measuring probe results in a frequency increase and in the other in a frequency reduction, the frequency difference can be used as measure for the angular deviation of the direction of flow from the reference direction.

What I claim is:

1. A flow-measuring probe comprising, a carrier member formed as the solid circumscribed by translating a generatrix completely around an axis parallel thereto along a curved path to provide a vortex-generating linear body placed in a fluid passing in a direction transverse thereto,
   an electrically insulating surface on said body,
   a laminar conductive layer superimposed on a leading edge portion of said surface and energized as a resistance element,
   and means for sensing the resistance of said element said layer comprising at least a pair of conductive leads extending longitudinally of the body being electrically connected on one surface thereof and having a sensing portion of restricted dimensions relative to said leads such that current passed therethrough heats said sensing portion to a greater degree and exhibits greater resistive change due to fluid flow therepast than said leads.

2. A probe according to claim 1, said sensing device comprising at least three lead portions formed in said conductive layer and at least two restricted portions each comprising a heating and resistive-change exhibiting portion of the probe.

3. A probe according to claim 2, said body being a circular cylinder and said sensing portions being arranged in spaced relation along the cylinder at less than 180° separation therearound.

4. A probe according to claim 3 said sensing portions being arranged symmetrically about a plane passing through said axis and a direction of flow in a surrounding fluid.

5. A probe according to claim 3, said sensing portions being arranged at substantially 15° to 30° on either side of a cylinder diameter perpendicular to the direction of flow.

6. A probe according to claim 1, said body being pivotally supported transversely of a direction of flow in a surrounding fluid and vane means attached to said body for orienting said body with a leading face continuously directed upstream.

7. A probe according to claim 1, said layer being externally electrically insulated.

8. A measuring device for determining the frequency of shedding of vortices from either side of a cylindrical body disposed across the flow of a fluid wherein the vortices may be formed continually, comprising a genatrix-formed cylinder means mounting said cylinder for pivotal rotation about the cylinder axis, vane means arranged downstream from said cylinder and connected to continuously orient said cylinder relative to fluid flow, a pair of electrically conductive strips arranged symmetrically about the cylinder relative to said vane means, and means for energizing said strips and detecting the change in current therein according to fluid velocity therepast.

9. A device according to claim 8, said strips being connected to an AC amplifier to provide amplification of AC components of signal representing said changes in current.

10. A measuring device according to claim 9 including means comparing frequencies of current variations in the two sensing strips as an indication of direction of flow.

11. A device according to claim 8, said cylinder being mounted in a fluid duct wherein the Reynolds number exceeds about 500 and said strips are both arranged along the cylinder facing the fluid flow.

12. A measuring device comprising a probe according to claim 8, an AC amplifier connected to a pair of leads to said sensing portion for amplification of periodic variations in resistance thereof, and means indicating the frequency of said variations as a digital count.

13. The method of measuring fluid flow along a pathway which comprises
   obstructing a portion of said pathway with a cylindrical solid object disposed transversely thereto to generate a vortex sheet downstream of the object, and
   detecting on at least one upstream shoulder as resistive changes in a conductor an AC signal corresponding in frequency to variations in rate of fluid flow said AC signal frequency corresponding to the frequency of vortex shedding in said sheet.

14. A flow-measuring probe comprising,
   a carrier member formed as the solid cylinder circumscribed by translating a generatrix completely around an axis parallel thereto along a curved path to provide a vortex generating linear body when placed transversely of a moving fluid,
   an electrically insulating surface on said body extending between end portions thereof,
   a laminar electrically conductive layer superimposed on portions of said surface between said end portions,
   said layer comprising at least a pair of conductive leads extending longitudinally of the body and a sensing portion of restricted lateral dimension relative to the lateral dimension of said leads such that the sensing portion exhibits greater resistive changes with temperature than said leads,
   means energizing said sensing portions by way of said leads to comprise a variable resistance element, and means for sensing said variable resistance.